July 23, 1929.  C. R. RANEY ET AL  1,721,712
ADJUSTING MEANS FOR TRACTOR DRAWN IMPLEMENTS
Filed July 26, 1926  2 Sheets-Sheet 1
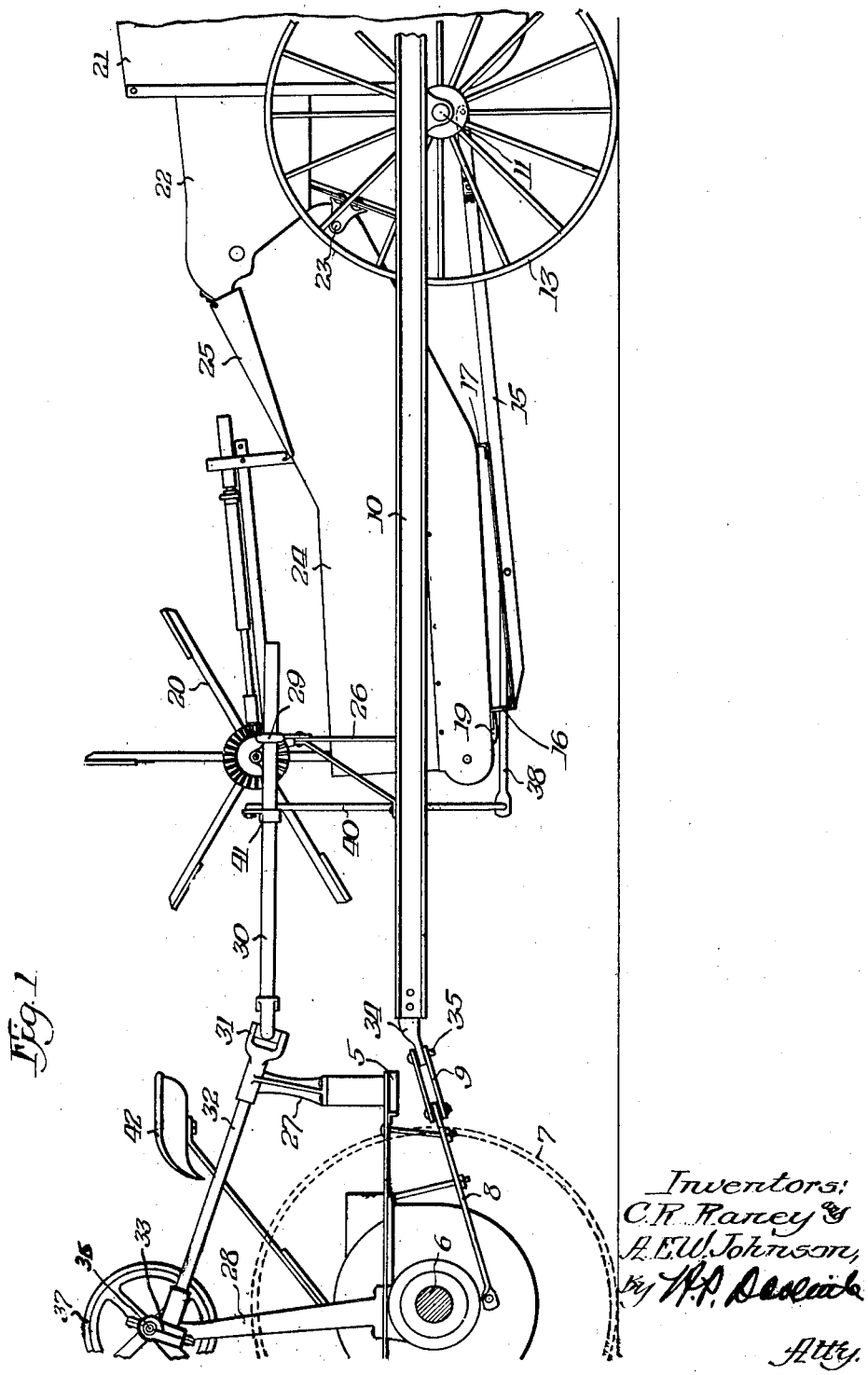

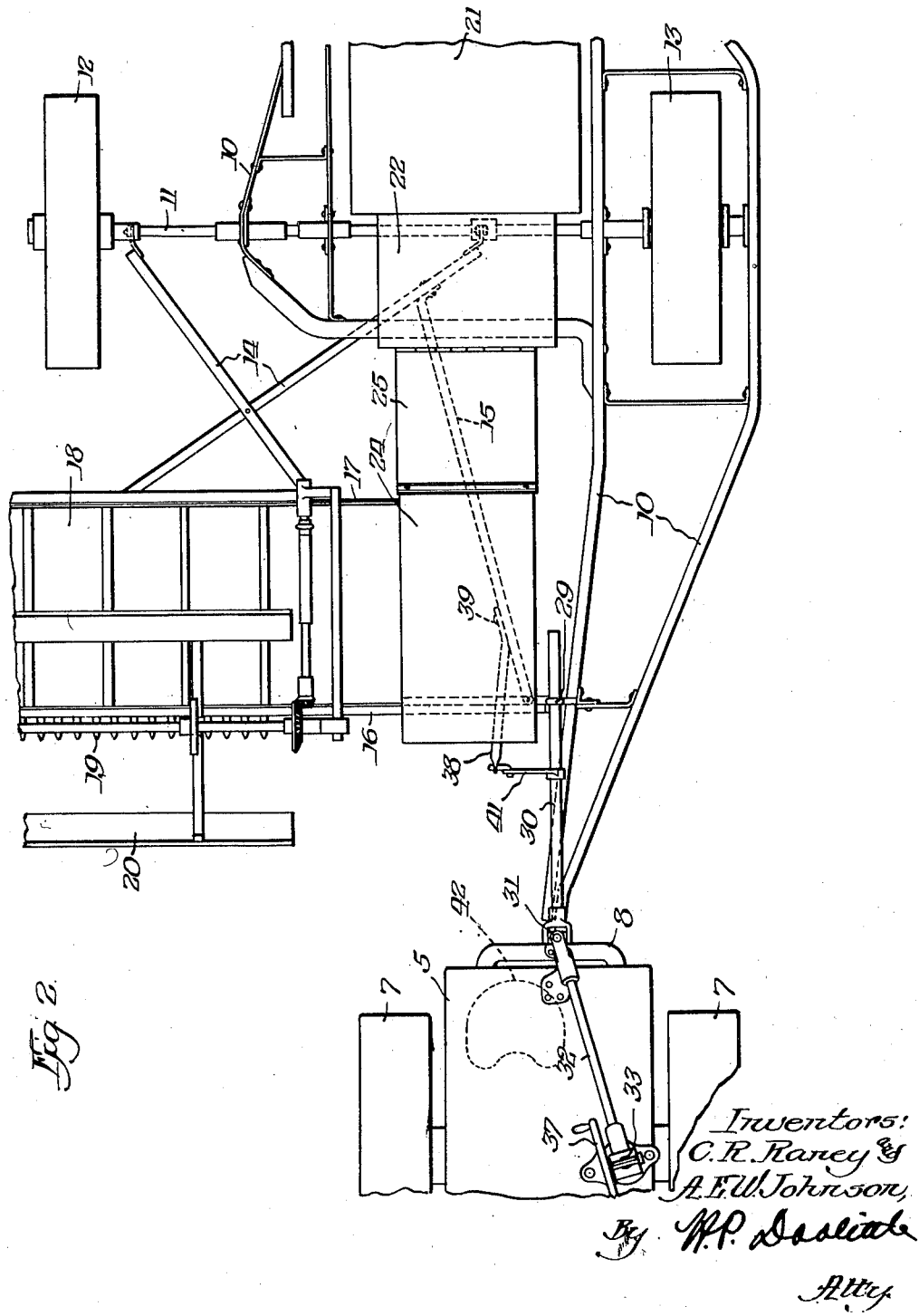

Patented July 23, 1929.

1,721,712

UNITED STATES PATENT OFFICE.

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY.

ADJUSTING MEANS FOR TRACTOR-DRAWN IMPLEMENTS.

Application filed July 26, 1926. Serial No. 124,992.

This invention relates to tractor drawn implements and particularly to means controlled from a location on the tractor, for effecting adjustment of an adjustable element on the drawn implement.

More specifically the invention relates to such an adjusting means for the header platform of a tractor drawn harvester thresher.

As is well known in this art, harvesters, and particularly harvester threshers embody a header platform which must be adjusted up or down in conformity with the length of grain encountered as the machine travels through the field.

Heretofore, in operating tractor drawn harvester threshers, it was necessary to have an attendant on the tractor and another on the harvester thresher to effect adjustment of the header platform. With the present invention the attendant on the drawn implement can be dispensed with, as he will be unnecessary. By making an extra man unnecessary, the cost of harvesting can be materially lowered.

Thus, the primary objects of the invention are to simplify and cheapen the cost of harvesting, by providing means located on a tractor for adjusting the platform of a harvester thresher; and to provide such a means which will always keep its point of control the same, relative to the position of the operator on the seat of the tractor, regardless of the angular position the harvester thresher may assume in trailing the tractor as when turning corners.

Briefly, these desirable objects are accomplished in the provision of a harvester thresher including a main frame and a heading platform. The main frame is directly and pivotally connected to the draw bar of a tractor, which pulls the machine. The platform is adjustable up and down by a control positioned on the tractor adjacent the operator's seat, said control operating connections which raise or lower the platform. These connections are so constructed that the position of the control with respect to the operator's position on the tractor seat is never altered, regardless of the angular position which the trailing harvester thresher may assume, as when the outfit turns a corner in the field.

Looking now to the drawings wherein an illustrative embodiment of this invention has been shown, it will be seen that Figure 1 is a side elevational view of the rear end of a tractor with a harvester thresher connected thereto, showing the improved control and adjusting means for the header platform of this implement; and Figure 2 is a plan view of the same structure shown in Figure 1.

The tractor shown embodies an operator's platform 5 supported in any conventional manner on a rear tractor axle 6 carried in traction wheels 7. Connected to the rear end of the tractor, as shown, is a rearwardly extending draw bar 8 carrying a clevis 9 for the attachment of implements, as will be understood.

The particular implement of this disclosure, which is to be drawn by the tractor, is a harvester thresher embodying a main frame 10 carried on a main axle 11 supported in the grain wheel 12 and a main wheel 13. At the grainward end of the axle it will be noted the same pivotally carries, forwardly extending crossed frame bars 14 and another frame bar 15 connected to one of the bars 14, as clearly shown in Figure 2. At the forward ends of these bars 14 and 15 are carried the conventional header platform Z-bar 16 and angle bar 17. These bars 16 and 17 support the usual transversely disposed harvester or header platform 18. The usual cutting mechanism represented by the guard fingers 19 is also shown. Similarly, a harvester reel 20 is also incidentally shown.

The main frame 10 of the harvester thresher, which is a rigid construction, supports at its rear end a separator housing 21, and forwardly thereof the usual cylinder housing 22. Pivoted on a shaft 23 shown in Figure 1 and supported above the frame 10 there is a forwardly extending feeder housing 24, as shown, the forward end of which rests slidably on the platform Z-bar 16. This housing has a pivoted cover 25, as shown, for purposes of inspection.

One of the rigid frame bars 10 of the harvester thresher carries an A frame support 26, and the tractor platform 5 carries a bracket or support 27, while forwardly thereof the platform of the tractor carries a post 28. The upper end of the frame support 26 carries a bearing 29 in which is turnably journaled a longitudinally extending shaft 30 universally connected by a knuckle 31 to a shaft 32 journaled in the bracket 27 and in a gear housing 33 on the upper end of the post 28.

It is to be observed here that the forward ends of the frame bars 10, which converge as shown, are connected by an eyed block 34 to the clevis 9, by means of the detachable pin 35. It will also be noted that the universal connection 31 for the shafting 30 and 32 is disposed directly above the pivotal connection of the implement or harvester thresher to the tractor draw bar. In the housing 33 the shaft 32 carries a gear meshing with a worm gear on a shaft 36, which shaft carries a hand control wheel 37 whereby operation of the hand wheel by the operator on the tractor platform will turn the shafting 32 and 30 by the gearing in the housing 33, as will be understood. The gearing is of the conventional worm type and has not been illustrated, as it is not thought that this will be necessary because of the obviousness of such construction.

It will be noted that the Z-bar 16 is pierced by a rod 38, which is bolted to the bar 15, as shown at 39 in Figure 2. The forward end of this rod 38 is connected by a vertical link 40 to a crank arm 41 made fast on the shaft 30. The tractor platform also carries an operator's seat 42, the same having been illustrated in dotted lines in Figure 2, so as not to obscure the full line parts therebeneath.

In operation, it can now be seen, that as the outfit travels through the field the harvester thresher can be raised or lowered in conformance with the length of grain encountered, by the operator on the tractor, who need merely turn the hand wheel 37 to turn the shafting 32 and 30, which will either pull up or push down on the bar 38 depending upon the direction of rotation of the hand wheel 37, as will be understood. As the platform is raised or lowered, the feeder housing 24 will rise or fall with it and slide over the platform, because of its independent pivotal connection on the shaft 23. The pivotal connection of the cover 25, as shown, will prevent any binding of this part, as it too will slide over the top of the housing 24. The universal knuckle connection 31 permits of fixing the control wheel 37 on the tractor platform in such a position that it will always be disposed forwardly of and the same relative distance from the operator's seat 42, regardless of the angular trailing positon which the harvester thresher may assume, as when turning corners in the field. This is a very desirable feature and overcomes the difficulties encountered with lever controls mounted on the draft connections between a tractor and a drawn implement, because when such an outfit makes turns in the field, these lever controls swing with the implement and do not keep the same position relative to the position of the operator on the tractor. Furthermore, with the control of this invention, the operator can always face forward and control the adjustment of the harvester platform, thus overcoming the disadvantage of having to turn around to manipulate controls to the rear of him, with the consequent disadvantage of not being able to see ahead of him for the purpose of steering a straight course. In such cases where it has been attempted to overcome the necessity of an operator having to turn around to operate control levers, such as by lengthening the control levers, it was found that when the outfit makes a sharp turn in the field the levers in swinging with the implement would forcefully eject the operator from his seat, which is not only objectionable, but highly dangerous. All of these disadvantages have been effectively overcome by the novel control and operating connections disclosed in this application.

It is to be understood that only an illustrative embodiment of this invention has been shown and described and that the same is obviously capable of changes, such for example as the substitution of a hand lever for the wheel 37, which could be geared up in a simple manner to rotate such shafting as that indicated by the numerals 32 and 30 in this specification. It is the intention in this application to cover all such changes as fall within the spirit and scope of this invention as indicated in the appended claims.

What we claim is:

1. The combination of a tractor and a drawn implement having an adjustable element, connections carried on the tractor and implement for adjusting said element, and means on the tractor for operating said connections.

2. The combination of a tractor and a drawn implement having an adjustable element, turnable shafting carried on the tractor and implement and connected to adjust said element, and control means on the tractor for turning said shafting.

3. The combination of a tractor and a drawn implement having an adjustable element, a turnable shaft supported on the tractor, a turnable shaft supported on the implement and connected to adjust said element, a universal connection between said shafts, and control means on the tractor for turning said first mentioned shaft.

4. The combination of a tractor and a drawn implement connected thereto, said implement including an adjustable element, shafting connected to adjust said adjustable element, said shafting including a universal connection above the connection of the implement to the tractor, and control means on the tractor for turning said shafting to adjust said adjustable element.

5. The combination of a tractor having an operator's seat, a drawn implement connected to said tractor, said implement including an adjustable element, shafting connected to adjust said adjustable element, said shafting including a universal connection above the connection of the implement to the tractor, and a control means on the tractor having a fixed position relative to said operator's seat for turning said shafting to adjust said adjustable element.

6. The combination of a tractor and a harvester thresher connected thereto, an adjustable header platform on the harvester thresher, turnable shafting connected to adjust said platform, and means on the tractor for operating said turnable shafting.

7. The combination of a tractor and a harvester thresher connected thereto, an adjustable header platform on the harvester thresher, shafting supported on the tractor and harvester thresher and connected to adjust said platform, and means on the tractor for turning said shafting to adjust said platform.

8. The combination of a tractor and a harvester thresher connected thereto, an adjustable header platform on the harvester thresher, shafting supported on the tractor and harvester thresher and connected to adjust said platform, a universal connection in said shafting disposed above the connection of the harvester thresher to the tractor, and control means on the tractor for turning said shafting to adjust said platform.

9. The combination of a tractor having an operator's seat, a harvester thresher connected to the tractor to be drawn thereby, an adjustable header platform on the harvester thresher, shafting connected to adjust said platform, said shafting including a universal connection above the connection of the harvester thresher to the tractor, and a control means on the tractor having a fixed position relative to said operator's seat for turning said shafting to adjust said platform.

10. The combination with a tractor having an operator's platform and a drawbar therebeneath, of a trailing implement pivotally connected to the tractor drawbar, an adjustable element included in the implement, turnable shafting including a flexible joint, said shafting carried on the implement and tractor platform, and means located on the tractor for operating said shafting for adjusting the adjustable element of the implement.

In testimony whereof we affix our signatures.

CLEMMA R. RANEY.
ARNOLD E. W. JOHNSON.